United States Patent
Yang et al.

(10) Patent No.: US 12,056,889 B2
(45) Date of Patent: Aug. 6, 2024

(54) MONOCULAR SNAPSHOT FOUR-DIMENSIONAL IMAGING METHOD AND SYSTEM

(71) Applicant: Tsinghua University, Beijing (CN)

(72) Inventors: Yuanmu Yang, Beijing (CN); Zicheng Shen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 344 days.

(21) Appl. No.: 17/744,129

(22) Filed: May 13, 2022

(65) Prior Publication Data

US 2023/0289989 A1    Sep. 14, 2023

(30) Foreign Application Priority Data

Mar. 11, 2022    (CN) .......................... 202210241266.X

(51) Int. Cl.
| | |
|---|---|
| *G06T 7/60* | (2017.01) |
| *G06F 30/20* | (2020.01) |
| *G06T 3/20* | (2006.01) |
| *G06F 111/10* | (2020.01) |

(52) U.S. Cl.
CPC .............. G06T 7/60 (2013.01); G06F 30/20 (2020.01); G06T 3/20 (2013.01); *G06F 2111/10* (2020.01); *G06T 2207/10028* (2013.01); *G06T 2207/10052* (2013.01)

(58) Field of Classification Search
CPC .............. G06T 7/60; G06T 3/20; G06F 30/20
See application file for complete search history.

(56) References Cited

U.S. PATENT DOCUMENTS

| | | | |
|---|---|---|---|
| 2017/0031151 A1* | 2/2017 | Cogswell | H04N 13/218 |
| 2020/0225386 A1* | 7/2020 | Tsai | G02B 1/002 |
| 2020/0288110 A1* | 9/2020 | Wang | H04N 13/218 |
| 2023/0289989 A1* | 9/2023 | Yang | G06F 30/20 |

* cited by examiner

*Primary Examiner* — Edward Park
(74) *Attorney, Agent, or Firm* — Hodgson Russ LLP

(57) ABSTRACT

A monocular snapshot four-dimensional imaging method and system are provided. The method includes constructing a numerical simulation model of an imaging system, and optimizing a phase distribution of an entrance pupil plane of the imaging system to determine a point spread function and a lens parameter corresponding to the phase distribution; building the imaging system, calibrating the point spread function, and obtaining a distortion parameter of the imaging system; taking a single shot on a target scene to obtain a single encoded image containing four-dimensional light field information of the target scene, and correcting the single encoded image according to the distortion parameter of the imaging system; and decoding the four-dimensional light field information of the target scene from the single encoded image according to the calibrated point spread function to obtain an intensity image, a polarization contrast image and a depth map of the target scene.

20 Claims, 5 Drawing Sheets

MONOCULAR SNAPSHOT FOUR-DIMENSIONAL IMAGING METHOD AND SYSTEM

CROSS-REFERENCE TO RELATED APPLICATION

This application claims priority to and benefits of Chinese Patent Application No. 202210241266.X, filed on Mar. 11, 2022, the entire contents of which is incorporated herein by reference.

FIELD

The present disclosure relates to a field of optical imaging and machine vision, and more particularly to a monocular snapshot four-dimensional imaging method and a monocular snapshot four-dimensional imaging system.

BACKGROUND

Multi-dimensional light field information of a scene includes two-dimensional light intensity, depth, polarization, and spectrum information of the detected scene. A traditional camera only obtains two-dimensional light intensity information of a target scene. Depth information is the distance from each point in the scene to the camera, which has wide applications in robotics, autonomous driving, intelligent manufacturing, face recognition and detection, augmented reality and other fields. The polarization and spectrum information of the light field may reveal even richer characteristics of a scene, and may be used for target recognition and tracking, feature analysis, and image enhancement.

A traditional multi-dimensional visual perception system generally requires increased volume, weight and power consumption, and sacrificed temporal and spatial resolution, making it difficult to meet requirements of many practical applications. For example, the depth information is generally acquired by active laser illumination or use of multiple lenses. Polarization imaging systems generally requires amplitude division, focal plane division or time domain multiplexing. Spectral detection is generally subjected to scanning by bulk dispersive light-splitting elements, space domain multiplexed filter arrays, or time domain multiplexed elements. It is more challenging to obtain multi-dimensional light field information including two-dimensional light intensity, depth, polarization, and spectrum at the same time, and it is necessary to further increase the volume and complexity of the system.

In recent years, metasurface has become a focus of research, which flexibly tunes amplitude, phase, and polarization of electromagnetic waves by designing sub-wavelength structure. The metasurface is integrated into an imaging system, and opens up new possibility to acquire depth, polarization, and spectrum information of a scene through the integrated and miniaturized system.

SUMMARY

In a first aspect of the present disclosure, a four-dimensional imaging method is provided. The four-dimensional imaging method includes: constructing a numerical simulation model of an imaging system and a phase distribution of an entrance pupil plane of the imaging system is optimized to determine a point spread function dependent on depth and polarization of a target scene and determine a lens parameter corresponding to the phase distribution; building an imaging system according to the design of point spread function and the lens parameter, calibrating the point spread function of the imaging system, and obtaining a distortion parameter of the imaging system; taking a single shot on the target scene by the imaging system to obtain a single encoded image containing four-dimensional light field information of the target scene, and correcting the single encoded image according to the distortion parameter of the imaging system, in which the four-dimensional light field information includes two-dimensional light intensity, depth and polarization of the target scene; and decoding the four-dimensional light field information of the target scene from the single encoded image according to the calibrated point spread function to obtain an intensity image, a polarization contrast image and a depth map of the target scene.

In some embodiments, the lens is a metasurface lens including a plurality of optical antennas arranged in an array. Constructing the numerical simulation model of the imaging system, and optimizing the phase distribution of the entrance pupil plane of the imaging system to determine the point spread function dependent on depth and polarization of the target scene and determine the lens parameter corresponding to the phase distribution includes: determining a material of the metasurface lens according to the loss and the refractive index in the target wavelength band, and determining a geometric structure of each of the optical antennas; determining geometric parameters of the optical antenna through simulation calculation to independently manipulate transmission phases of one or more pairs of orthogonal polarized light; selecting a physical model to initially determine a transmission phase of the metasurface lens required by the point spread function dependent on the depth and the polarization of the target scene; performing iterative optimization on the initially determined transmission phase by maximizing focal light energy of the point spread function; and selecting a geometrical parameter of an optical antenna of a metasurface lens at (x, y) coordinates from the geometrical parameters of the optical antenna according to the optimized transmission phase.

In some embodiments, the point spread function is a single helix point spread function. The one pair of the orthogonal polarized light is x-polarized light and y-polarized light. The more pairs of orthogonal polarized light include any two or three pairs of polarized light of: a pair of x-polarized light and y-polarized light, and a pair of orthogonal linearly polarized light obtained by rotating polarization directions of the x-polarized light and the y-polarized light by 45°; a pair of x-polarized light and y-polarized light, and a pair of left-handed circularly polarized light obtained by rotating the polarization directions of the x-polarized light and the y-polarized light by 45°; and a pair of x-polarized light and y-polarized light, and a pair of right-handed circularly polarized light obtained by rotating the polarization directions of the x-polarized light and the y-polarized light by 45°.

In some embodiments, selecting the physical model to initially determine the transmission phase of the metasurface lens required by the point spread function dependent on the depth and the polarization of the target scene includes: initially determining the transmission phase of the metasurface lens by adding an additional phase term for generating the single helix point spread function to a standard lens focusing term and a polarization splitting term.

When one pair of orthogonal linearly polarized light is selected,

A standard lens focusing term and a polarization splitting term $\psi_{xf}$ for x-polarized light are determined by:

$$\psi_{xf}(x, y) = -\frac{2\pi}{\lambda}\left[\sqrt{x^2 + y^2 + f^2 + 2xf\sin\theta} - f\right]$$

A standard lens focusing term and a polarization splitting term $\psi_{yf}$ for y-polarized light are determined by:

$$\psi_{xf}(x, y) = -\frac{2\pi}{\lambda}\left[\sqrt{x^2 + y^2 + f^2 - 2xf\sin\theta} - f\right]$$

where f represents a focal length of the metasurface lens, θ represents an off-axis angle of polarization splitting, and x, y represents two-dimensional coordinates of the entrance pupil plane along x-axis and y-axis;

An additional phase term $\psi_{xr}(u, \varphi_u)$ for generating the single helix point spread function for the x-polarized light is determined by:

$$\psi_{xr}(u, \varphi_u) = \left\{l\varphi_u \middle| \left(\frac{l-1}{L}\right)^\varepsilon \le u \le \left(\frac{l}{L}\right)^\varepsilon, l = 1, \ldots, L\right\}$$

An additional phase term $\psi_{yr}(u, \varphi_u)$ for generating the single helix point spread function for the y-polarized light is determined by:

$$\psi_{yr}(u, \varphi_u + \pi) = \left\{l\varphi_u \middle| \left(\frac{l-1}{L}\right)^\varepsilon \le u \le \left(\frac{l}{L}\right)^\varepsilon, l = 1, \ldots, L\right\}$$

where u represents a normalized radial coordinate of the entrance pupil plane, $\varphi_u$ represents an azimuth angle of the entrance pupil plane, L represents a parameter for adjusting a rotation rate of the single helix point spread function with a depth of a target scene, and ε represents a coefficient for adjusting a relationship between a compactness of the single helix point spread function and a shape invariance.

In some embodiments, performing iterative optimization on the transmission phase initially determined by maximizing focal light energy of the point spread function includes: calculating the complex amplitudes of the single helix point spread functions corresponding to a plurality of on-axis point light sources located at different depths on the imaging plane, using angular spectrum method, when the initially determined phase distribution is placed on the entrance pupil plane; multiplying the complex amplitudes by an optimization function, in which the optimization function meets a two-dimensional Gaussian function centered at the peak of the main lobe of the point spread function with cut-off boundaries, which is used to iteratively increase the fraction of light energy confined in the main lobe of the single-helix point spread function; propagating the complex amplitudes of the optimized point spread functions back to the entrance pupil plane; weighted averaging the complex amplitudes corresponding to point light sources at different depths, in which the sum of weights is 1; determining as 1 the amplitude in the complex amplitude of the entrance pupil plane after weighting and averaging to reserve the phase as an input for a next iteration; and repeating the iterative optimization until the proportion of light energy in the focal main lobe of the point spread function is stable to optimize the transmission phase.

In some embodiments, decoding the four-dimensional light field information of the target scene from the single encoded image according to the calibrated point spread function to obtain the intensity image, the polarization contrast image and the depth map of the target scene includes: cutting regions corresponding to two geometric image points from the single encoded image to obtain two encoded image blocks with the same size; labeling an outline of a target object in the two encoded image blocks; performing template matching on the labeled outline of each target object in the two encoded image blocks to obtain an optimal matching position; obtaining a translation vector of each target object according to the optimal matching position of the target object, in which the azimuth angle of the translation vector is the azimuth angle of the point spread function; obtaining the depth of each target object according to the azimuth angle of the point spread function and a relationship between the calibrated point spread function and the depth of the target object, and obtaining the depth map of each target object according to the depth of the target object and the outline of the target object; translating objects in the two encoded image blocks back to the position of the geometric image points according to the translation vector to obtain two decoded intensity images corresponding to orthogonal polarized components; and obtaining the polarization contrast image by dividing the two intensity images.

In some embodiments, decoding the four-dimensional light field information of the target scene from the single encoded image according to the calibrated point spread function to obtain the intensity image, the polarization contrast image and the depth map of the target scene includes: generating encoded images from images with accurate four-dimensional information by numerical calculation according to the determined point spread function to determine a training set; constructing and training a neural network to obtain four-dimensional light field information from the encoded image, and training parameters of the neural network by taking as a loss function a difference between the four-dimensional light field information obtained by the neural network and the accurate four-dimensional light field information to obtain a trained neural network; and obtaining the four-dimensional light field information from the captured encoded image using the trained neural network.

In some embodiments, decoding the four-dimensional light field information of the target scene from the single encoded image according to the calibrated point spread function to obtain the intensity image, the polarization contrast image and the depth map of the target scene includes: constructing a training set according to images with accurate four-dimensional light field information; constructing a neural network, inputting the image with accurate four-dimensional light field information into the neural network, simulating and generating an encoded image by the neural network according to the transmission phase obtained by the last iteration, obtaining a four-dimensional light field information according to the encoded image, and updating parameters of the neural network and the phase distribution through back propagation by taking as a loss function a difference between the four-dimensional light field information obtained by the neural network and the accurate four-dimensional light field information to obtain a trained neural network; and obtaining the four-dimensional light field information from the captured encoded image using the trained neural network.

In some embodiments, a geometric structure of an optical antenna includes a circular cross-section, an elliptic cross-section, or a polygonal cross-section.

In some embodiments, a material of the optical antenna is selected from the group consisting of silicon, silicon nitride, titanium dioxide, gallium phosphide, gallium nitride, gallium arsenide, or a combination thereof.

In some embodiments, the geometric parameter of the optical antenna includes a length and a width of the optical antenna.

In some embodiments, the length and the width of the optical antenna are each ranging from 100 nm to 340 nm.

In a second aspect of the present disclosure, a four-dimensional imaging system is provided. The imaging system includes a metasurface lens, a photoelectric sensor array and an image processor. The metasurface lens is configured to receive light from the target scene. The photoelectric sensor array is configured to receive light from the metasurface lens. The image processor is configured to construct a numerical simulation model of the imaging system and optimize a phase distribution of an entrance pupil plane of the imaging system to determine a point spread function dependent on depth and polarization of the target scene and determine a parameter of the metasurface lens corresponding to the phase distribution; calibrate the point spread function of the imaging system and obtain a distortion parameter of the imaging system; obtain a single encoded image containing four-dimensional light field information of the target scene, and correct the single encoded image according to the distortion parameter of the imaging system, in which the four-dimensional light field information includes two-dimensional light intensity, depth and polarization of the target scene; and decode the four-dimensional light field information of the target scene from the single encoded image according to the calibrated point spread function to obtain an intensity image, a polarization contrast image and a depth map of the target scene.

In some embodiments, the metasurface lens comprises a plurality of optical antennas arranged in an array. The image processor is configured to determine a material of the metasurface lens according to a loss and a refractive index in a target wavelength band, and determine a geometric structure of the optical antenna; determine geometric parameters of each of the optical antennas through simulation calculation to independently control transmission phases of one or more pairs of orthogonal polarized light; select a physical model to initially determine a transmission phase of the metasurface lens required by the point spread function dependent on the depth and the polarization of the target scene; perform iterative optimization on the initially determined transmission phase by maximizing focal light energy of the point spread function; and select a geometrical parameter of an optical antenna of a metasurface lens at (x, y) coordinates from the geometrical parameters of the optical antenna according to the optimized transmission phase.

In some embodiments, the point spread function is a single helix point spread function. The one pair of the orthogonal polarized light is x-polarized light and y-polarized light. The more pairs of orthogonal polarized light include any two or three pairs of polarized light of: a pair of x-polarized light and y-polarized light, and a pair of orthogonal linearly polarized light obtained by rotating polarization directions of the x-polarized light and the y-polarized light by 45°; a pair of x-polarized light and y-polarized light, and a pair of left-handed circularly polarized light obtained by rotating the polarization directions of the x-polarized light and the y-polarized light by 45°; and a pair of x-polarized light and y-polarized light, and a pair of right-handed circularly polarized light obtained by rotating the polarization directions of the x-polarized light and they-polarized light by 45°.

In some embodiments, the geometric structure of the optical antenna includes a circular cross-section, an elliptic cross-section, or a polygonal cross-section.

In some embodiments, a material of the optical antenna is selected from the group consisting of silicon, silicon nitride, titanium dioxide, gallium phosphide, gallium nitride, gallium arsenide, or a combination thereof.

In some embodiments, the geometric parameter of the optical antenna includes a length and a width of the optical antenna.

In some embodiments, the length and the width of the optical antenna are each ranging from 100 nm to 340 nm.

In some embodiments, when the target scene is a point light source, the metasurface lens is configured to focus an incident light in an orthogonal polarization state at different positions on a plane of the photoelectric sensor array to form a pair of single helix point spread functions.

BRIEF DESCRIPTION OF THE DRAWINGS

The drawings, which are included to provide a further understanding of the present disclosure and are incorporated in and constitute a part of this specification, illustrate embodiments of the invention and together with the description serve to explain the present disclosure, but shall not be construed to limit the present disclosure.

DETAILED DESCRIPTION

A further detailed description is hereinafter given to the present disclosure with reference to embodiments and accompanying drawings so as to make the objectives, technical solutions and merits thereof more apparent. It should be understood that the embodiments described herein are only used to explain the present disclosure, but not to limit the present disclosure.

On the contrary, the present disclosure covers all alternatives, modifications, and equivalents as made within the spirit and scope of the appended claims. Further, in order to further understand the present disclosure, some specific details are described in detail in the following detailed description of the present disclosure. The specific details not described in the present disclosure are within the knowledge of those skilled in the art.

Figure 1:
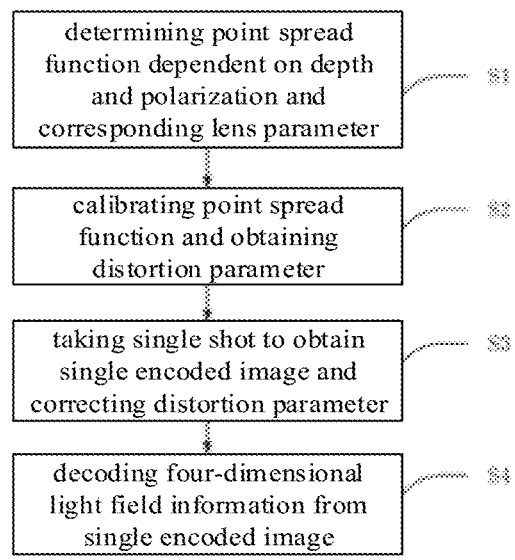
FIG. 1 is a flow chart of a monocular snapshot four-dimensional imaging method in some embodiments of the present disclosure.

As shown in FIG. 1, in a first aspect of the present disclosure, a monocular snapshot four-dimensional imaging method is provided. The four-dimensional imaging method includes steps S1 to S4 as follows.

In step S1, a numerical simulation model of an imaging system is constructed, and a phase distribution of an entrance pupil plane of the imaging system is optimized to determine a point spread function dependent on depth and polarization of a target scene and determine a lens parameter corresponding to the phase distribution.

In step S2, the imaging system is built according to the point spread function and the lens parameter, the point spread function of the imaging system is calibrated, and a distortion parameter of the imaging system is obtained.

In step S3, a single shot is taken on the target scene by the imaging system to obtain a single encoded image containing four-dimensional light field information of the target scene, and the single encoded image is corrected according to the distortion parameter of the imaging system. The four-dimensional light field information includes two-dimensional light intensity, depth and polarization of the target scene.

In step S4, the four-dimensional light field information of the target scene is decoded from the single encoded image according to the calibrated point spread function to obtain an intensity image, a polarization contrast image and a depth map of the target scene.

The output image g (x, y) of the imaging system on a two-dimensional photoelectric sensor is a convolution of a system's input light field f(x, y, z, p) and the point-spread function $PSF_{z,p}(x, y)$ of the imaging system, and the input light field contains multi-dimensional information such as two-dimensional light intensity projection, scene depth, and polarization. A traditional imaging method only considers an impulse response of the imaging system to two-dimensional light intensity, that is, PSF(x, y), which leads to loss of information on other dimensions. The imaging method provided in embodiments of the present disclosure may acquire multi-dimensional light field information based on the monocular snapshot without laser illumination by jointly designing the impulse response of the imaging system to the multi-dimensional light field and the image decoding method. The imaging method provided in embodiments of the present disclosure has extremely low complexity, facilitates integration and miniaturization of the imaging system, and may obtain high-precision four-dimensional light field information with less cost, less volume, less weight, less energy consumption than a traditional imaging method.

In some embodiments of the present disclosure, in step S1, any point spread function highly dependent on the depth and polarization of the target scene may be used to acquire high-precision depth and polarization information, and the correlation level may be quantitatively measured by Fisher information, and may be designed with physical models and optimization algorithms including deep learning.

In some embodiments of the present disclosure, for the imaging system based on the metasurface lens that may independently control the transmission phase of a pair of orthogonal polarized light, the point spread function dependent on the depth and the polarization of the target scene may be designed. In addition, by further designing the metasurface lens, a plurality of pairs of orthogonal polarized light may be independently controlled to achieve a full Stokes polarization imaging.

Figure 2:
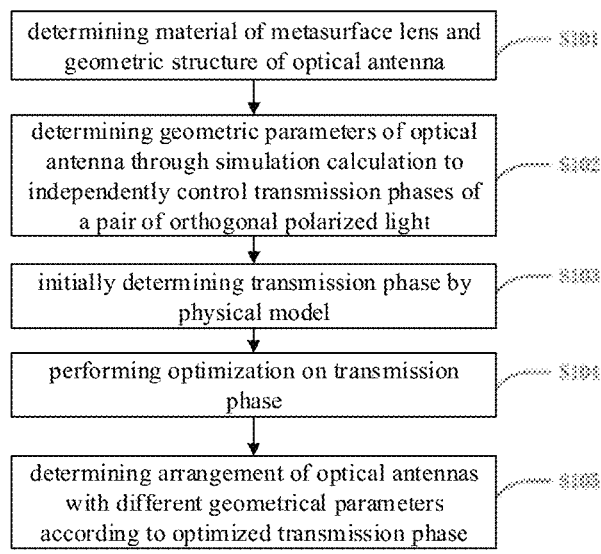
FIG. 2 is a flow chart of determining a point spread function and corresponding lens parameters for four-dimensional imaging in an imaging method in some embodiments of the present disclosure.

As shown in FIG. 2, in some embodiments of the present disclosure, the step S1 may include steps S101 to S105 as follows.

In step S101, a material of the metasurface lens is determined according to a loss and a refractive index in a target wavelength band, and a geometric structure of an optical antenna is determined to independently control the transmission phase of a pair of orthogonal polarized light. The geometric structure refers to a cross-sectional shape of the optical antenna, such as a circle, a polygon, or the like.

Figure 3:
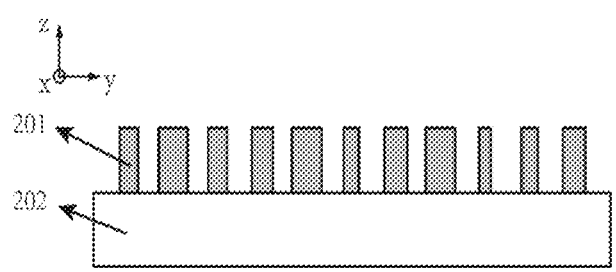
FIG. 3 is a side view of a metasurface lens for a four-dimensional imaging method in some embodiments of the present disclosure.
Figure 4:
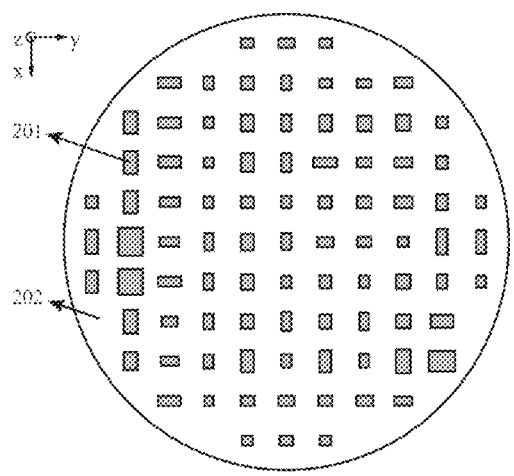
FIG. 4 is a top view of a metasurface lens for a four-dimensional imaging method in some embodiments of the present disclosure.

FIG. 3 and FIG. 4 show a side view and a top view of a metasurface lens for a four-dimensional imaging method in some embodiments of the present disclosure. The metasurface lens is composed of a substrate 202 and a plurality of optical antennas 201 arranged in a two-dimensional array on a surface of the substrate 202. Each optical antenna 201 has a height within a sub-wavelength range, and is formed from a dielectric material with a high refractive index of more than 2, including silicon, silicon nitride, titanium dioxide, gallium phosphide, gallium nitride, gallium arsenide or the like. In some embodiments of the present disclosure, the metasurface lens may be of transmission type, the substrate 202 may be a transparent substrate with a transmittance more than 80%, such as molten glass or quartz, and the optical antenna 201 may be made of silicon.

A direction parallel to a row of the optical antenna array is used as an x-axis, and a direction parallel to a column of the optical antenna array is used as a y-axis. An xyz coordinate system is established by a right hand rule. A cross-section shape of each optical antenna 201 may be a rectangle, an ellipse or other shape with $C_2$ symmetry. In some embodiments of the preset disclosure, the cross-sectional shape of the optical antenna 201 is rectangular. The optical antennas 201 with a fixed height in the optical antenna array may be used to independently control orthogonal polarized light by designing different lengths and widths of the optical antennas 201.

In step S102, a geometric parameter of the optical antenna is determined through simulation calculation to independently control the transmission phase of a pair of orthogonal polarized light. The geometric parameter specifically refers to a specific size of a geometric structure determined based on the geometric structure of the optical antenna in step S101.

In some embodiments of the present disclosure, the step S102 may be implemented as follows.

Figure 5A:
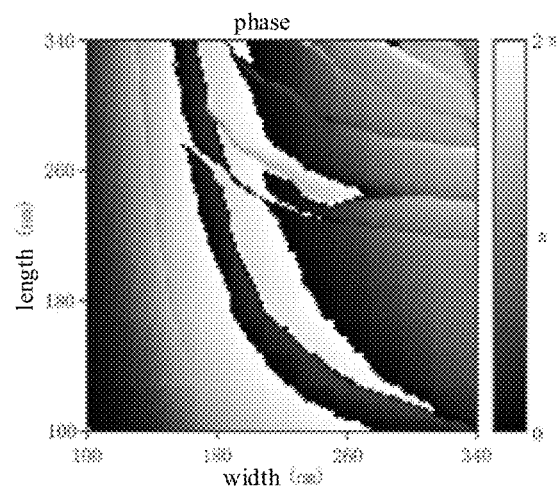
FIG. 5A is a schematic diagram showing a relationship between a modulation amount of a phase of x-polarized light by each antenna and a length and a width of the antenna.
Figure 5B:
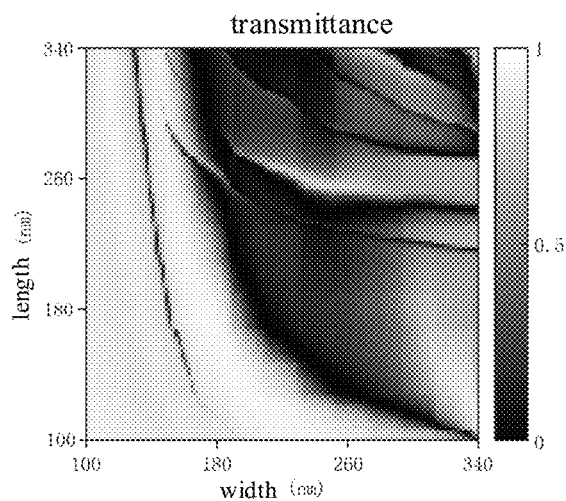
FIG. 5B is a schematic diagram showing a relationship between a transmittance of x-polarized light by each antenna and a length and a width of the antenna.
Figure 5C:
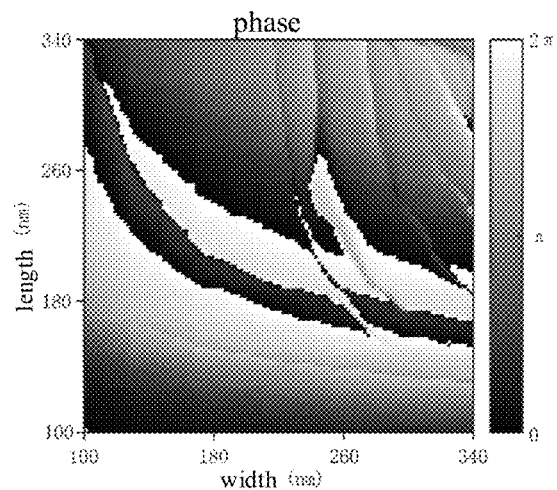
FIG. 5C is a schematic diagram showing a relationship between a modulation amount of a phase of y-polarized light by each antenna and a length and a width of the antenna.
Figure 5D:
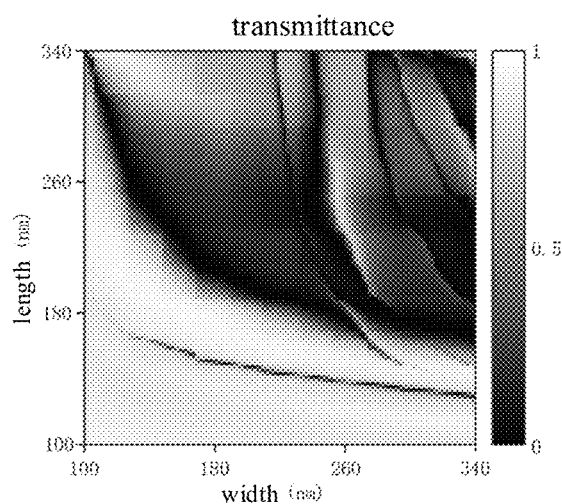
FIG. 5D is a schematic diagram showing a relationship between a transmittance of y-polarized light by each antenna and a length and a width of the antenna.

According to a working wavelength λ, by a finite difference time domain (FDTD) calculation or a rigorous coupled wave analysis (RCWA), a modulation of the phase and transmission of a pair of orthogonal polarized incident lights by a single optical antenna is calculated at different heights, center distance, width, and length. In some embodiments of the present disclosure, the pair of the orthogonal polarized light is x-polarized light and y-polarized light. In some embodiments of the present disclosure, the working wavelength may be 800 nm, a fixed height of a silicon column antenna may be 600 nm, a center distance may be 400 nm, and a length and a width of the optical antenna may range from 100 nm to 340 nm, respectively. FIG. 5A is a schematic diagram showing a relationship between a modulation amount of a phase of x-polarized light by each antenna and the length L and the width W of the antenna. FIG. 5B is a schematic diagram showing a relationship between a transmittance of x-polarized light by each antenna and the length L and the width W of the antenna. FIG. 5C is a schematic diagram showing a relationship between a modulation amount of a phase of y-polarized light by each antenna and the length L and the width W of the antenna. FIG. 5D is a schematic diagram showing a relationship between a transmittance of y-polarized light by each antenna and the length L and the width W of the antenna. The modulation amount of the phase may range from 0 to 2π, and the transmittance is close to 1. A multi-order (such as 6 to 10-order) linear phase may divide a range of [0, 2π]. In some embodiments of the present disclosure, a 8-order linear phase divides a range of [0, 2π] into 0°, 45°, 90°, 135°, 180°, 225°, 270°, 315°. According to a transmission phase value of the x-polarized light corresponding to the 8-order phase and a transmission phase value of the y-polarized light corresponding to the 8-order phase, geometric parameters of 64 groups of nanoantennas with a transmission rate of near 1 may be selected with meeting a corresponding transmission phase value. Thus, the desired geometric parameters of the nanoantennas may be obtained to independently control the transmission phase of the orthogonal polarized light when the transmission rate is close to 1. In addition, by rotating the optical antennas, different orthogonal polarized components may be independently controlled, such that several different types of the optical antennas with the orthogonal polarized components independently controlled may be multiplexed in space to realize a full Stocks polarization imaging.

In step S103, a physical model is selected to initially determine a transmission phase of the metasurface lens required by a point spread function dependent on the depth and the polarization of the target scene.

In some embodiments of the present disclosure, the point spread function is a single helix point spread function. The pair of the orthogonal polarized light is x-polarized light and y-polarized light. A plurality of pairs of orthogonal polarized light comprise any two or three pairs of polarized light of:
a pair of x-polarized light and y-polarized light, and a pair of orthogonal linearly polarized light obtained by rotating polarization directions of the x-polarized light and the y-polarized light by 45°;
a pair of x-polarized light and y-polarized light, and a pair of left-handed circularly polarized light obtained by rotating the polarization directions of the x-polarized light and the y-polarized light by 45°; and
a pair of x-polarized light and y-polarized light, and a pair of right-handed circularly polarized light obtained by rotating the polarization directions of the x-polarized light and the y-polarized light by 45°.

In some embodiments of the present disclosure, the orthogonal polarized components are separated at different areas on the imaging plane to be focused in the form of a pair of conjugated single helix point spread functions to form two completely decoupled polarized images without sacrificing resolution. The single helix point spread function has a focal point that rotates around a geometric image point as a function of the depth of the object point, and maintains shape stability within a considerable depth of field (DOF). The two polarized images may be registered to obtain a rotation angle, thereby obtaining depth information. The single helix point spread function has a Fisher information along depth dimension two orders of magnitude more than that of a point spread function of a standard lens, and a larger depth of field than the standard lens, thereby acquiring the depth information with high precision and large depth of field. An image formed by this point spread function may be used to directly obtain two-dimensional light intensity information and polarization information with a depth of field much larger than that of the standard lens, without deconvolution process that consumes time and affects image fidelity.

In some embodiments of the present disclosure, the step S103 may be implemented as follows.

The transmission phase of the metasurface lens is initially determined by adding an additional phase term for generating the single helix point spread function to a standard lens focusing term and a polarization splitting term.

A standard lens focusing term and a polarization splitting term $\psi_{xf}$ for x-polarized light are determined by:

$$\psi_{xf}(x, y) = -\frac{2\pi}{\lambda}\left[\sqrt{x^2 + y^2 + f^2 + 2xf\sin\theta} - f\right];$$

a standard lens focusing term and a polarization splitting term $\psi_{yf}$ for y-polarized light are determined by:

$$\psi_{yf}(x, y) = -\frac{2\pi}{\lambda}\left[\sqrt{x^2 + y^2 + f^2 - 2xf\sin\theta} - f\right],$$

where f=20 mm, which represents a focal length of the metasurface lens, θ=8°, which represents an off-axis angle of polarization splitting, and x, y represents two-dimensional coordinates of the entrance pupil plane along x-axis and y-axis.

The additional phase term for generating the single helix point spread function for the x-polarized light is determined as $\psi_{xr}(u, \varphi_u)$, and the additional phase term for generating the single helix point spread function for the y-polarized light is determined as $\psi_{yr}(u, \varphi_u)$, which are obtained by a Fresnel zone method. The Fresnel zone method is a process where rings carrying a helical phase distribution with increasing topological quantum towards outer rings are arranged in the entrance pupil plane of the imaging system, which may generate a compact rotational point spread function with large depth of field.

The additional phase term $\psi_{xr}(u, \varphi_u)$ for generating the single helix point spread function for the x-polarized light is determined by $$\psi_{xr}(u, \varphi_u) = \left\{ l\varphi_u \left| \left(\frac{l-1}{L}\right)^\varepsilon \le u \le \left(\frac{l}{L}\right)^\varepsilon, l = 1, \ldots, L \right. \right\};$$

and the additional phase term $\psi_{yr}(u, \varphi_u)$ for generating the single helix point spread function for the y-polarized light is determined by $$\psi_{yr}(u, \varphi_u + \pi) = \left\{ l\varphi_u \left| \left(\frac{l-1}{L}\right)^\varepsilon \le u \le \left(\frac{l}{L}\right)^\varepsilon, l = 1, \ldots, L \right. \right\};$$

where u represents a normalized radial coordinate of the entrance pupil plane, $\varphi_u$ represents an azimuth angle of the entrance pupil plane, [L, $\varepsilon$] represents adjustable parameters, L represents a parameter for adjusting a rotation rate of the single helix point spread function as a function of the depth of a target scene, and $\varepsilon$ is a parameter for adjusting a relationship between the compactness of the single helix point spread function and the shape invariance. In some embodiments of the present disclosure, [L, $\varepsilon$]=[6, 0.5], that is, L is 6, and $\varepsilon$ is 0.5. In some embodiments of the present disclosure, the additional transmission phase term for the y-polarized light is obtained by rotating the additional transmission phase term for the x-polarized light by 180 degrees.

In step S104, an iterative optimization is performed on the initially determined transmission phase to maximize focal light energy of the point spread function to reduce side lobe effect and to improve quality of the point spread function.

In some embodiments of the present disclosure, the step S104 may be implemented as follows.

When the initially determined phase distribution is placed on the entrance pupil plane, by an angular spectrum method, complex amplitudes of the single helix point spread functions on the imaging plane corresponding to nine on-axis point light sources located at different depths on the imaging plane are calculated. The complex amplitudes of the single helix point spread functions is multiplied by an optimization function, and the optimization function is a complex amplitude meeting a two-dimensional Gaussian distribution. The proportion of light energy restricted within a focal main lobe of the single helix point spread function is iteratively increased with an amplitude peak of the complex amplitude meeting the two-dimensional Gaussian distribution being centered at. The complex amplitudes of the optimized point spread functions are propagated back to the entrance pupil plane. The complex amplitudes corresponding to point light sources at different depths are weighted and averaged, and the sum of the weights is 1. The amplitude in the complex amplitude of the entrance pupil plane after weighting and averaging is determined as 1, so as to reserve the phase as an input for a next iteration. The iterative optimization is repeated until the proportion of light energy in the focal main lobe of the point spread function is stable to optimize the transmission phase.

Figure 6A:
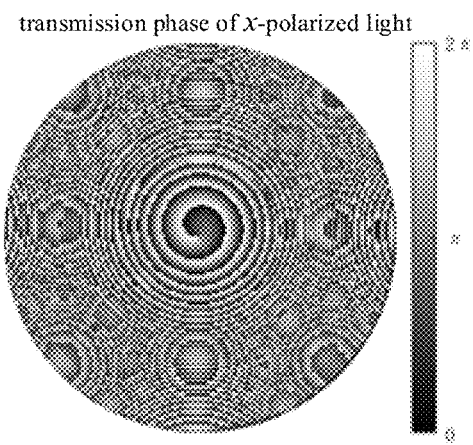
FIG. 6A is a schematic diagram showing a transmission phase of x-polarized light by a metasurface lens for multi-dimensional imaging in some embodiments of the present disclosure.
Figure 6B:
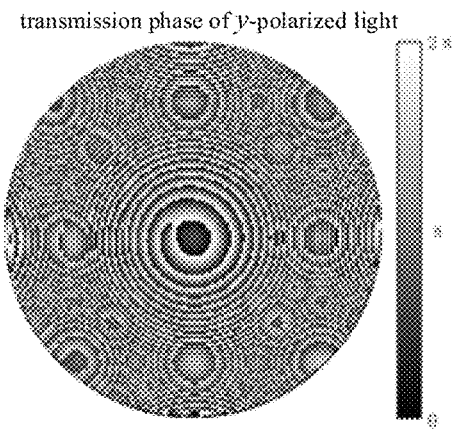
FIG. 6B is a schematic diagram showing a transmission phase of y-polarized light by a metasurface lens for multi-dimensional imaging in some embodiments of the present disclosure.
Figure 7:
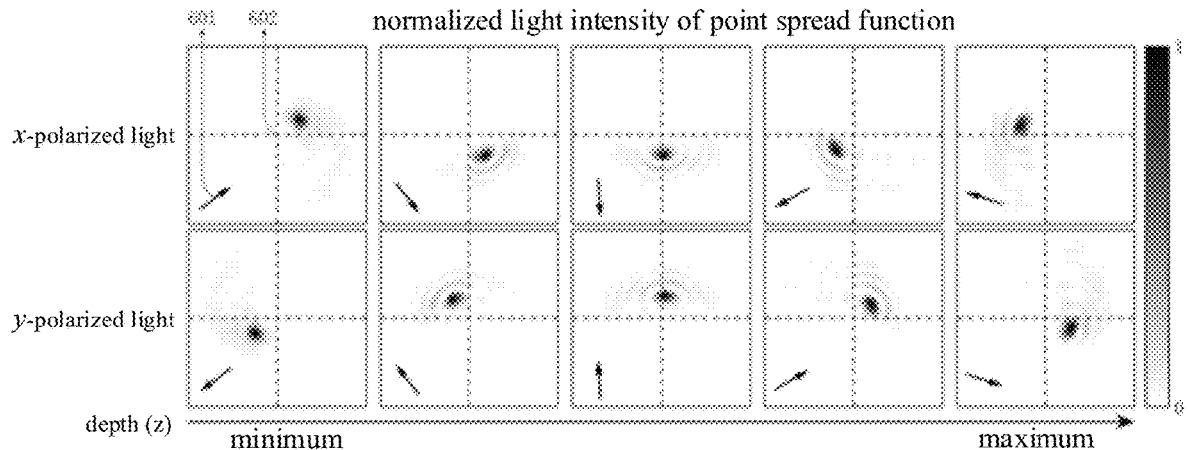
FIG. 7 is a schematic diagram showing point spread functions of x-polarized light and y-polarized light for point light sources located at different depths in object space obtained by an imaging method in some embodiments of the present disclosure.

In some embodiments of the present disclosure, after ten times of iterative optimization, the optimized design of the transmission phase of the metasurface lens for a pair of orthogonal polarized light is shown in FIG. 6A and FIG. 6B, and the point spread functions corresponding to the two orthogonal polarized light are shown in FIG. 7. The reference numeral 601 indicates a rotation direction of the point spread function, and reference numeral 602 indicates a position of a geometric image point.

In step S105, according to the optimized transmission phase obtained in step S104, a geometrical parameter of an optical antenna of a metasurface lens at (x, y) coordinates is selected from the geometrical parameters of the optical antenna obtained in step S102.

In some embodiments of the present disclosure, the step S2 may include the steps as follows. According to the metasurface lens parameter determined in step S1 and using a photoelectric sensor, the actual imaging system is built, and the actual point spread function of the imaging system for point light sources located at different depths and with different polarization states is measured. In addition, by a calibration process such as the one proposed by Zhengyou ZHANG, the distortion parameter of the imaging system is obtained.

In some embodiments of the present disclosure, the step S3 may include the steps as follows. A single shot of the target scene is taken by the built imaging system in step S2, so as to obtain an image with four-dimensional information of the target scene encoded by the point spread function, which is recorded as the single encoded image. The single encoded image is corrected according to the distortion parameter obtained in step S2.

Figure 8:
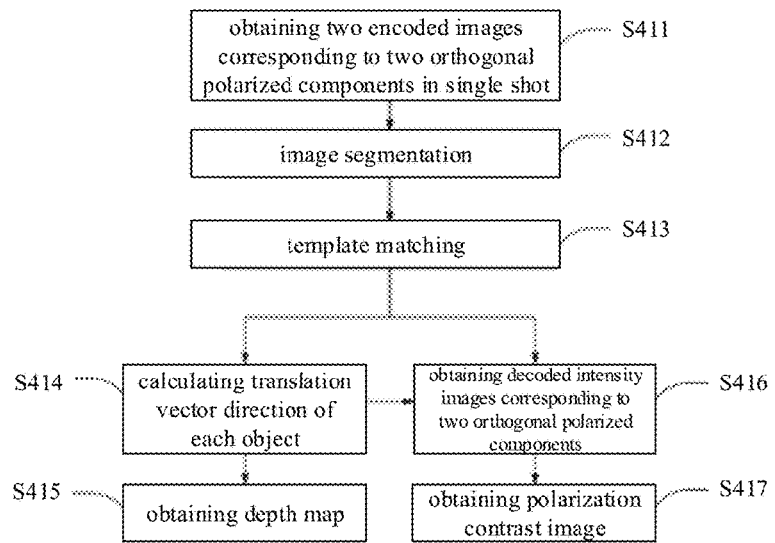
FIG. 8 is a flow chart of a decoding process in an imaging method in some embodiments of the present disclosure.

In some embodiments of the present disclosure, as shown in FIG. 8, in step S4, an explicit correspondence of the depth and polarization information to the point spread function is provided, and the four-dimensional light field information of the target scene is directly obtained by an image processing method without deep learning. The step S4 includes steps S411 to S417 as follows.

In step S411, regions corresponding to two geometric image points are cut from the single encoded image in step S3 to obtain two encoded image blocks with the same size.

In step S412, an outline of a target object is labelled in the two encoded image blocks by an image segmentation algorithm. Alternatively, a Canny edge detection process is first used to perform edge detection, and a connected region detection algorithm is then used to extract connected regions and to remove too small regions, thereby obtaining the outline of the target object in the encoded image block.

In step S413, a template matching is performed on the labelled outline of each target object in the two encoded image blocks to obtain an optimal matching position. It is assumed that each target object is roughly located at a uniform depth, the two encoded images formed by the pair of conjugated single helix point spread functions have a translation correspondence, which may be obtained by template matching.

In step S414, a translation vector of each target object is obtained according to the optimal matching position of the target object. The azimuth angle of the translation vector is the azimuth angle of the single helix point spread function.

In step S415, a depth of each target object is obtained according to the azimuth angle of the point spread function and a relationship between the point spread function calibrated in step S2 and the depth of the target object, and the depth map of each target object is obtained according to the outline of the target object obtained in step S412 and the depth of the target object.

In step S416, objects in the two encoded image blocks are translated back to the position of the geometric image points according to the translation vector obtained in step S414 to obtain two decoded intensity images corresponding to orthogonal polarized components.

In step S417, the two intensity images obtained in step S416 are divided to obtain the polarization contrast image. The polarization contrast image may be used for object recognition, feature analysis and the like.

Figure 9:
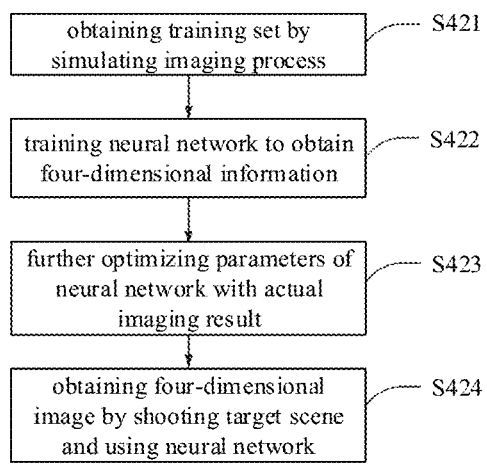
FIG. 9 is a flow chart of another decoding process in an imaging method in some embodiments of the present disclosure.

In other embodiments of the present disclosure, as shown in FIG. 9, in step S4, the four-dimensional light field information of the target scene is obtained based on a deep learning process. The deep learning process refers to a process of training a neural network to obtain multi-dimensional light field information from encoded images by a training set, and obtaining the multi-dimensional light field information from an actual image using the trained neutral network. The deep learning process may be also used to jointly optimize neural network parameters and the design parameters of the point spread function.

In some embodiments of the present disclosure, the step S4 may include the step S421 to step S424 as follows.

In step S421, encoded images are generated from images with accurate four-dimensional information by numerical calculation according to the point spread function determined in step S1 to determine a training set.

In step S422, a suitable convolutional neural network, such as U-net is selected. For example, the neural network is trained to obtain four-dimensional light field information from the encoded image generated in step S421. By taking as a loss function a difference between the four-dimensional light field information obtained by the neural network and the accurate four-dimensional light field information, parameters of the neural network are trained to obtain a trained neural network. Alternatively, a process of simulating and generating the encoded image in step S421 is embedded into a training loop, that is, the image with the accurate four-dimensional light field information is directly used as an input of the neural network during training to simulate and generate an encoded image according to the transmission phase obtained by the last iteration. The transmission phase in a first iteration is the transmission phase obtained in step S104. The four-dimensional light field information is obtained according to the neural network, and parameters of the neural network and transmission phase distribution (i.e. point spread function determination) are updated through back propagation by taking as a loss function a difference between the four-dimensional light field information obtained by the neural network and the accurate four-dimensional light field information, to obtain a trained neural network, thereby performing the joint optimization.

In step S423 (optional), since the process of simulating and generating the encoded image in step S421 is different from an actual imaging process, a certain amount of actual captured images is used to further adaptively train the neural network trained by the simulated imaging, to optimize the parameters of the neural network.

In step S424, the four-dimensional light field information is obtained from the captured encoded image using the trained neural network.

The deep learning process may be matched with a more abstract correspondence of the point spread function to the depth and polarization information, and may deal with more complex scenes, but is limited by the training set. In some embodiments of the present disclosure, two decoding processes shown in FIG. 8 and FIG. 9 do not require priori information and have high processing speed.

Figure 10:
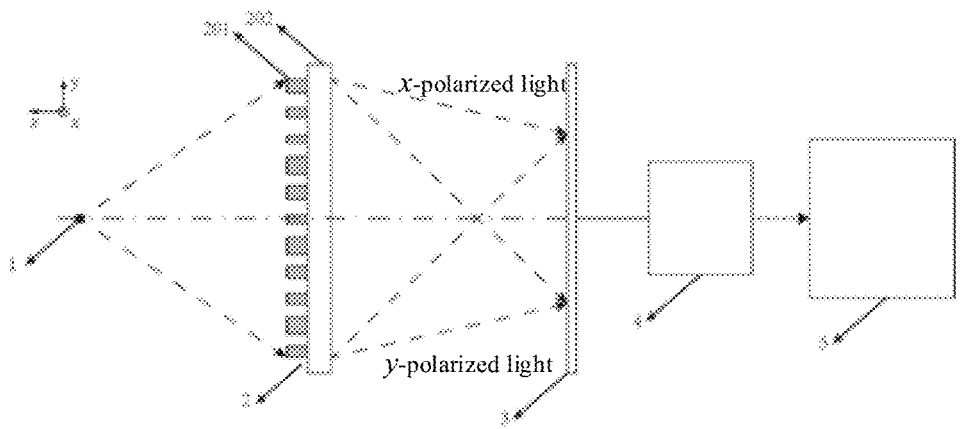
FIG. 10 is a schematic diagram showing a four-dimensional imaging system and an optical path thereof in some embodiments of the present disclosure.

In a second aspect of the present disclosure, a four-dimensional imaging system based on monocular snapshot is provided. As shown in FIG. 10, the four-dimensional imaging system includes a metasurface lens 2, a photoelectric sensor array 3 and an image processor 4.

The four-dimensional imaging system is used for detecting a target scene 1 to obtain four-dimensional light field information 5. The metasurface lens 2 has parameters obtained by step S1 of the imaging method according to any embodiment of the first aspect. The image processor 4 is configured to execute instructions to perform step S4 of the imaging method according to any embodiment of the first aspect.

In some embodiments, the image processor 4 is configured to construct a numerical simulation model of the imaging system and optimize a phase distribution of an entrance pupil plane of the imaging system to determine a point spread function dependent on depth and polarization of the target scene and determine a parameter of the metasurface lens 2 corresponding to the phase distribution; calibrate the point spread function of the imaging system and obtain a distortion parameter of the imaging system; obtain a single encoded image containing four-dimensional light field information of the target scene, and correct the single encoded image according to the distortion parameter of the imaging system, in which the four-dimensional light field information includes two-dimensional light intensity, depth and polarization of the target scene; and decode the four-dimensional light field information of the target scene from the single encoded image according to the calibrated point spread function to obtain an intensity image, a polarization contrast image and a depth map of the target scene.

In some embodiments, the metasurface lens 2 comprises a plurality of optical antennas arranged in an array. The image processor 4 is configured to determine a material of the metasurface lens 2 according to a loss and a refractive index in a target wavelength band, and determine a geometric structure of the optical antenna; determine geometric parameters of each of the optical antennas through simulation calculation to independently control transmission phases of one or more pairs of orthogonal polarized light; select a physical model to initially determine a transmission phase of the metasurface lens 2 required by the point spread function dependent on the depth and the polarization of the target scene; perform iterative optimization on the initially determined transmission phase to maximize focal light energy of the point spread function; and select a geometrical parameter of an optical antenna of a metasurface lens 2 at (x, y) coordinates from the geometrical parameters of the optical antenna according to the optimized transmission phase.

In some embodiments, when the target scene is a point light source, the metasurface lens is configured to focus an incident light in an orthogonal polarization state at different positions on a plane of the photoelectric sensor array to form a pair of single helix point spread functions.

As shown in FIG. 10, a working process of the monocular snapshot four-dimensional imaging system provided by embodiments of the second aspect of the present disclosure is as follows.

When the target scene 1 is a point light source located at a certain depth, the metasurface lens 2 may perform off-axis focus of an incident light in an orthogonal polarization state at different positions on a plane of the photoelectric sensor array 3 to form a pair of single helix point spread functions as shown in FIG. 7. In some embodiments of the present disclosure, the metasurface lens 2 may perform off-axis focus of the incident light in the orthogonal polarization state on different areas of the photoelectric sensor array 3 to form two non-overlapping images.

When the imaging system shoots the target scene 1, the photoelectric sensor array 3 performs a single exposure to obtain an encoded image that encodes the target four-dimensional scene information. The encoded image is processed through the image processor 4, such as a computer, a mobile phone chip, a field programmable gate array, etc., and the four-dimensional light field information 5 of the target scene is obtained by running instructions corresponding to step S4.

To sum up, in embodiments of the present disclosure, the multi-dimensional parameters of the light field may be flexibly controlled by the metasurface lens, and the multi-dimensional light field information of the target object may be encoded on the imaging plane through the metasurface lens to obtain multi-dimensional light field information from the single encoded image in combination with the image acquisition algorithm. The output image g(x, y) of the imaging system on a two-dimensional photoelectric sensor is a convolution of a system's input light field f (x, y, z, p) and the point-spread function $PSF_{z,p}(x, y)$ of the imaging system, and the input light field contains multi-dimensional information such as two-dimensional light intensity projection, scene depth, and polarization. A traditional imaging method only considers an impulse response of the imaging system to two-dimensional light intensity, that is, PSF(x, y), which leads to loss of information on other dimensions. The imaging method provided in embodiments of the present disclosure may acquire multi-dimensional light field information based on monocular snapshot without laser illumination by jointly designing the impulse response of the imaging system to the multi-dimensional light field and the image decoding method. The imaging method provided in embodiments of the present disclosure has extremely low complexity, facilitates integration and miniaturization of the imaging system, and may obtain high-precision four-dimensional light field information with less cost, less volume, less weight, less energy consumption than a traditional imaging method.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more of this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A four-dimensional imaging method, comprising:
constructing a numerical simulation model of an imaging system, and optimizing a phase distribution of an entrance pupil plane of the imaging system to determine a point spread function dependent on depth and polarization of a target scene and determine a lens parameter corresponding to the phase distribution;
building the imaging system according to the point spread function and the lens parameter, calibrating the point spread function of the imaging system, and obtaining a distortion parameter of the imaging system;
taking a single shot on the target scene by the imaging system to obtain a single encoded image containing four-dimensional light field information of the target scene, and correcting the single encoded image according to the distortion parameter of the imaging system, wherein the four-dimensional light field information comprises two-dimensional light intensity, depth and polarization of the target scene; and
decoding the four-dimensional light field information of the target scene from the single encoded image according to the calibrated point spread function to obtain an intensity image, a polarization contrast image and a depth map of the target scene.

2. The imaging method according to claim 1, wherein the lens is a metasurface lens comprising a plurality of optical antennas arranged in an array, and
constructing the numerical simulation model of the imaging system, and optimizing the phase distribution of the entrance pupil plane of the imaging system to determine the point spread function dependent on depth and polarization of the target scene and determine the lens parameter corresponding to the phase distribution comprises:
determining a material of the metasurface lens according to a loss and a refractive index in a target wavelength band, and determining a geometric structure of each of the optical antennas;
determining geometric parameters of the optical antenna through simulation calculation to independently control transmission phases of one or more pairs of orthogonal polarized light;
selecting a physical model to initially determine a transmission phase of the metasurface lens required by the point spread function dependent on the depth and the polarization of the target scene;
performing iterative optimization on the transmission phase initially determined by maximizing focal light energy of the point spread function; and
selecting a geometrical parameter of an optical antenna of a metasurface lens at (x, y) coordinates from the geometrical parameters of the optical antenna according to the optimized transmission phase.

3. The imaging method according to claim 2, wherein the point spread function is a single helix point spread function; the one pair of the orthogonal polarized light is x-polarized light and y-polarized light; and
the more pairs of orthogonal polarized light comprise any two or three pairs of polarized light of:

a pair of x-polarized light and y-polarized light, and a pair of orthogonal linearly polarized light obtained by rotating polarization directions of the x-polarized light and the y-polarized light by 45°;
a pair of x-polarized light and y-polarized light, and a pair of left-handed circularly polarized light obtained by rotating the polarization directions of the x-polarized light and the y-polarized light by 45°; and
a pair of x-polarized light and y-polarized light, and a pair of right-handed circularly polarized light obtained by rotating the polarization directions of the x-polarized light and the y-polarized light by 45°.

4. The imaging method according to claim 3, wherein selecting the physical model to initially determine the transmission phase of the metasurface lens required by the point spread function dependent on the depth and the polarization of the target scene comprises:
initially determining the transmission phase of the metasurface lens by adding an additional phase term for generating the single helix point spread function to a standard lens focusing term and a polarization splitting term,
wherein when one pair of linearly orthogonal polarized light is selected,
a standard lens focusing term and a polarization splitting term $\psi_{xf}$ for x-polarized light are determined by:

$$\psi_{xf}(x, y) = -\frac{2\pi}{\lambda}\left[\sqrt{x^2 + y^2 + f^2 + 2xf\sin\theta} - f\right]$$

a standard lens focusing term and a polarization splitting term $\psi_{yf}$ for y-polarized light are determined by:

$$\psi_{yf}(x, y) = -\frac{2\pi}{\lambda}\left[\sqrt{x^2 + y^2 + f^2 - 2xf\sin\theta} - f\right]$$

where f represents a focal length of the metasurface lens, θ represents an off-axis angle of polarization splitting, and x, y represents two-dimensional coordinates of the entrance pupil plane along x-axis and y-axis;
an additional phase term $\psi_{xr}(u, \varphi_u)$ for generating the single helix point spread function for the x-polarized light is determined by:

$$\psi_{xr}(u, \varphi_u) = \left\{l\varphi_u \left| \left(\frac{l-1}{L}\right)^\varepsilon \le u \le \left(\frac{l}{L}\right)^\varepsilon, l = 1, \ldots, L\right.\right\}$$

an additional phase term $\psi_{yr}(u, \varphi_u)$ for generating the single helix point spread function for the y-polarized light is determined by:

$$\psi_{yr}(u, \varphi_u + \pi) = \left\{l\varphi_u \left| \left(\frac{l-1}{L}\right)^\varepsilon \le u \le \left(\frac{l}{L}\right)^\varepsilon, l = 1, \ldots, L\right.\right\}$$

where u represents a normalized radial coordinate of the entrance pupil plane, $\varphi_u$ represents an azimuth angle of the entrance pupil plane, L represents a parameter for adjusting a rotation rate of the single helix point spread function with a depth of a target scene, and ε represents a coefficient for adjusting a relationship between the compactness of the single helix point spread function and the shape invariance.

5. The imaging method according to claim 3, wherein performing iterative optimization on the transmission phase initially determined by maximizing focal light energy of the point spread function comprises:
- calculating complex amplitudes of the single helix point spread function on the imaging plane corresponding to a plurality of on-axis point light sources located at different depths by angular spectrum method, when the initially determined phase distribution is placed on the entrance pupil plane;
- multiplying the complex amplitudes by an optimization function, wherein the optimization function meets a two-dimensional Gaussian function centered at the peak of the main lobe of the point spread function with cut-off boundaries, which is used to iteratively increase the fraction of light energy confined in the main lobe of the single-helix point spread function;
- propagating the complex amplitudes of the optimized point spread functions back to the entrance pupil plane;
- weighting and averaging the complex amplitudes corresponding to point light sources at different depths, wherein the sum of weights is 1;
- determining as 1 the amplitude in the complex amplitude of the entrance pupil plane after weighting and averaging to reserve the phase as an input for a next iteration; and
- repeating the iterative optimization until the proportion of light energy in the focal main lobe of the point spread function is stable to optimize the transmission phase.

6. The imaging method according to claim 2, wherein the geometric structure of the optical antenna includes a circular cross-section, an elliptic cross-section, or a polygonal cross-section.

7. The imaging method according to claim 2, wherein a material of the optical antenna is selected from the group consisting of silicon, silicon nitride, titanium dioxide, gallium phosphide, gallium nitride, gallium arsenide, or a combination thereof.

8. The imaging method according to claim 2, wherein the geometric parameter of the optical antenna includes a length and a width of the optical antenna.

9. The imaging method according to claim 8, wherein the length and the width of the optical antenna are each ranging from 100 nm to 340 nm.

10. The imaging method according to claim 1, wherein decoding the four-dimensional light field information of the target scene from the single encoded image according to the calibrated point spread function to obtain the intensity image, the polarization contrast image and the depth map of the target scene comprises:
- cutting regions corresponding to two geometric image points from the single encoded image to obtain two encoded image blocks with the same size;
- labeling an outline of a target object in the two encoded image blocks;
- performing template matching on the labeled outline of each target object in the two encoded image blocks to obtain an optimal matching position;
- obtaining a translation vector of each target object according to the optimal matching position of the target object, wherein an azimuth angle of the translation vector is an azimuth angle of the point spread function;
- obtaining a depth of each target object according to the azimuth angle of the point spread function and a relationship between the calibrated point spread function and the depth of the target object, and obtaining the depth map of each target object according to the depth of the target object and the outline of the target object;
- translating objects in the two encoded image blocks back to the position of the geometric image points according to the translation vector to obtain two decoded intensity images corresponding to orthogonal polarized components; and
- obtaining the polarization contrast image by dividing the two intensity images.

11. The imaging method according to claim 1, wherein decoding the four-dimensional light field information of the target scene from the single encoded image according to the calibrated point spread function to obtain the intensity image, the polarization contrast image and the depth map of the target scene comprises:
- generating encoded images from images with accurate four-dimensional information by numerical calculation according to the determined point spread function to determine a training set;
- constructing and training a neural network to obtain four-dimensional light field information from the encoded image, and training the parameters of the neural network by taking as a loss function a difference between the four-dimensional light field information obtained by the neural network and the accurate four-dimensional light field information to obtain a trained neural network; and
- obtaining the four-dimensional light field information from the captured encoded image using the trained neural network.

12. The imaging method according to claim 1, wherein decoding the four-dimensional light field information of the target scene from the single encoded image according to the calibrated point spread function to obtain the intensity image, the polarization contrast image and the depth map of the target scene comprises:
- constructing a training set according to images with accurate four-dimensional light field information;
- constructing a neural network, inputting the image with accurate four-dimensional light field information into the neural network, simulating and generating an encoded image according to the transmission phase obtained by the last iteration, obtaining four-dimensional light field information according to the encoded image, and updating parameters of the neural network and the phase distribution through back propagation by taking as a loss function a difference between the four-dimensional light field information obtained by the neural network and the accurate four-dimensional light field information to obtain a trained neural network; and
- obtaining the four-dimensional light field information from the captured encoded image with the trained neural network in use.

13. A four-dimensional imaging system, comprising:
- a metasurface lens configured to receive light from a target scene;
- a photoelectric sensor array configured to receive light from the metasurface lens; and
- an image processor configured to:
  - construct a numerical simulation model of the imaging system and optimize a phase distribution of an entrance pupil plane of the imaging system to determine a point spread function dependent on depth and polarization of the target scene and determine a parameter of the metasurface lens corresponding to the phase distribution;

calibrate the point spread function of the imaging system and obtain a distortion parameter of the imaging system;

obtain a single encoded image containing four-dimensional light field information of the target scene, and correct the single encoded image according to the distortion parameter of the imaging system, wherein the four-dimensional light field information comprises two-dimensional light intensity, depth and polarization of the target scene; and decode the four-dimensional light field information of the target scene from the single encoded image according to the calibrated point spread function to obtain an intensity image, a polarization contrast image and a depth map of the target scene.

14. The imaging system according to claim 13, wherein the metasurface lens comprises a plurality of optical antennas arranged in an array, and the image processor is configured to:

determine a material of the metasurface lens according to a loss and a refractive index in a target wavelength band, and determine a geometric structure of the optical antenna;

determine geometric parameters of each of the optical antennas through simulation calculation to independently control transmission phases of one or more pairs of orthogonal polarized light;

select a physical model to initially determine a transmission phase of the metasurface lens required by the point spread function dependent on the depth and the polarization of the target scene;

perform iterative optimization on the initially determined transmission phase by maximizing focal light energy of the point spread function; and select a geometrical parameter of an optical antenna of a metasurface lens at (x, y) coordinates from the geometrical parameters of the optical antenna according to the optimized transmission phase.

15. The imaging system according to claim 14, wherein the point spread function is a single helix point spread function;

the one pair of the orthogonal polarized light is x-polarized light and y-polarized light; and the more pairs of orthogonal polarized light comprise any two or three pairs of polarized light of:

a pair of x-polarized light and y-polarized light, and a pair of orthogonal linearly polarized light obtained by rotating polarization directions of the x-polarized light and the y-polarized light by 45°;

a pair of x-polarized light and y-polarized light, and a pair of left-handed circularly polarized light obtained by rotating the polarization directions of the x-polarized light and the y-polarized light by 45°; and a pair of x-polarized light and y-polarized light, and a pair of right-handed circularly polarized light obtained by rotating the polarization directions of the x-polarized light and the y-polarized light by 45°.

16. The imaging system according to claim 14, wherein the geometric structure of the optical antenna includes a circular cross-section, an elliptic cross-section, or a polygonal cross-section.

17. The imaging system according to claim 14, wherein a material of the optical antenna is selected from the group consisting of silicon, silicon nitride, titanium dioxide, gallium phosphide, gallium nitride, gallium arsenide, or a combination thereof.

18. The imaging system according to claim 14, wherein the geometrical parameter of the optical antenna includes a length and a width of the optical antenna.

19. The imaging system according to claim 18, wherein the length and the width of the optical antenna are each ranging from 100 nm to 340 nm.

20. The imaging system according to claim 13, wherein when the target scene is a point light source, the metasurface lens is configured to focus an incident light in an orthogonal polarization state at different positions on a plane of the photoelectric sensor array to form a pair of single helix point spread functions.

* * * * *